(12) United States Patent
Kikuta et al.

(10) Patent No.: US 6,577,024 B2
(45) Date of Patent: Jun. 10, 2003

(54) ELECTRIC POWER STEERING CONTROLLER

(75) Inventors: Kazuo Kikuta, Tokyo (JP); Katsuhiko Ohmae, Tokyo (JP); Hiroshi Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 74 days.

(21) Appl. No.: 09/859,893

(22) Filed: May 18, 2001

(65) Prior Publication Data

US 2002/0057015 A1 May 16, 2002

(30) Foreign Application Priority Data

Nov. 10, 2000 (JP) ........................................ 2000-344081

(51) Int. Cl.[7] ................................................. B60L 1/00
(52) U.S. Cl. ..................................... 307/10.1; 318/293
(58) Field of Search ......................... 307/10.1; 180/443, 180/446; 318/432, 293

(56) References Cited

U.S. PATENT DOCUMENTS

| | | | | |
|---|---|---|---|---|
| 4,234,834 A | * | 11/1980 | Jennings | 318/285 |
| 4,967,133 A | * | 10/1990 | Hasegawa | 318/759 |
| 5,369,540 A | * | 11/1994 | Konrad et al. | 361/6 |
| 5,523,665 A | * | 6/1996 | Deaver | 320/166 |
| 5,804,973 A | * | 9/1998 | Shinohara et al. | 324/548 |
| 5,889,376 A | * | 3/1999 | Takatsuka et al. | 180/446 |
| 5,994,789 A | * | 11/1999 | Ochiai | 180/65.3 |
| 6,029,767 A | * | 2/2000 | Kifuku | 180/443 |
| 6,141,494 A | * | 10/2000 | Nishino et al. | 318/432 |
| 6,194,792 B1 | | 2/2001 | Yanou et al. | 307/10.1 |
| 6,212,447 B1 | * | 4/2001 | Kohge et al. | 701/1 |
| 6,268,708 B1 | * | 7/2001 | Kawada et al. | 318/138 |
| 6,373,217 B1 | * | 4/2002 | Kawada et al. | 180/443 |

FOREIGN PATENT DOCUMENTS

| | | | |
|---|---|---|---|
| JP | 6-270824 | 9/1994 | ............ B62D/5/04 |
| WO | 99/17977 | 4/1999 | ............ B62D/5/04 |

* cited by examiner

*Primary Examiner*—Brian Sircus
*Assistant Examiner*—Sharon A. Polk
(74) *Attorney, Agent, or Firm*—Sughrue Mion, PLLC

(57) ABSTRACT

In the prior art electric power steering controller, if it is restarted immediately after being turned off, melting and welding of a contact of a relay are detected while a smoothing capacitor is not yet fully discharged. This may lead to a misdetection. A novel electric power steering controller has a relay contact voltage detection circuit and a discharging circuit. The relay contact voltage detection circuit is located between the battery of a vehicle and an electric motor to give an assisting torque to a steering wheel and acts to detect the voltage at the contact of a relay on the side of the electric motor, the relay controlling the output from the battery. Then, melting and welding of the relay contact are detected, based on the voltage at the relay contact detected by the relay contact voltage detection circuit.

14 Claims, 9 Drawing Sheets

PRIOR ART

ELECTRIC POWER STEERING CONTROLLER

BACKGROUND OF THE INVENTION

1. Field of the Invention

The present invention relates to an automotive electric power steering controller for detecting whether a relay has melted and welded at the start of operation.

2. Description of the Related Art

FIG. 9 shows the structure of a known electric power steering controller disclosed, for example, in Japanese Patent Laid-Open No. 64289/1993. This controller has an electric motor 1 for delivering an assisting torque to the steering wheel (not shown) of a vehicle and a battery 2 for supplying motor current IM to the motor 1, for driving it.

A capacitor 3 having a large capacity of about 1000 $\mu$F to 3600 $\mu$F absorbs the ripple component of the motor current IM. A shunt resistor 4 is used to detect the motor current IM. A bridge circuit 5 is made up of plural semiconductor switching elements Q1–Q4 such as FETs (Field Effect Transistors) for switching the motor current IM according to the magnitude and the direction of the assisting torque. A relay 6 passes or cuts off the motor current IM according to the need.

A driver circuit 7 switches semiconductor switching elements Q1–Q4 and drives the motor 1 via the bridge circuit 5 and actuates the relay 6. A motor current detection means 8 detects the motor current IM from both ends of the shunt resistor 4. The driver circuit 7 and the motor current detection means 8 form an interface circuit for a microcomputer (described later). A torque sensor 9 detects the steering torque T applied to the steering wheel. A vehicle speed sensor 10 detects the vehicle speed V of the vehicle.

The aforementioned microcomputer (CPU) is indicated by numeral 12 and calculates the assisting torque, based on the steering torque T and the vehicle speed V. The microcomputer 12 feeds back the motor current IM and creates a driver signal corresponding to the assisting torque. This microcomputer 12 applies driving signals to the driver circuit 7. One of the driving signals consists of an instruction $D_0$ indicating the direction of rotation for controlling the bridge circuit 5. The other driving signal consists of an amount of controlling current $I_0$.

The microcomputer 12 comprises a motor current determining means 13, a subtractor means 14, and a PID arithmetic means 15. The motor current-determining means 13 creates the instruction $D_0$ indicating the direction of rotation of the motor 1 and an instruction Im indicating an amount of motor current corresponding to the assisting torque. The subtractor means 14 calculates the current deviation $\Delta I$ of the motor current IM from the instructed motor current Im. The PID arithmetic means 15 calculates amounts of correction of proportional (P) term, integral (I) term, and derivative (D) term from the current deviation $\Delta I$ and creates an amount of controlling current $I_0$ corresponding to a pulse width modulation (PWM) duty ratio.

The microcomputer 12 further includes an A/D converter, a PWM timer circuit, and other components (none of which are shown) and has a self-diagnosing function. When the system is started, the microcomputer judges whether a contact of the relay 6 has melted and welded. Also, the microcomputer makes a fault diagnosis on the system. If no fault is found, the microcomputer actuates the relay 6 and supplies electric power to the bridge circuit 5. During operation of the system, the microcomputer constantly makes a self-diagnosis to judge whether the system is operating normally. If a trouble occurs, the microcomputer causes the driver circuit 7 to open the relay 6, thus cutting off the motor current IM.

The operation of this electric power steering system is described by referring to FIG. 9. The microcomputer 12 accepts the steering torque T and the vehicle speed V from the torque sensor 9 and the vehicle speed sensor 10, respectively. The motor current IM is fed back to the microcomputer 12 from the shunt resistor 4. The microcomputer 12 creates the instruction $D_0$ for the direction of rotation of the power steering and the amount of controlling current $I_0$ corresponding to the amount of the assisting torque, and sends these to the driver circuit 7.

Under steady-state operating conditions, the driver circuit 7 closes the relay 6 that is normally open. When the instruction $D_0$ for the direction of rotation and the amount of controlling current $I_0$ are input, the microcomputer creates a PWM driving signal and sends it to the semiconductor switching elements Q1–Q4 of the bridge circuit 5.

Thus, the motor current IM is supplied from the battery 2 to the motor 1 via the relay 6, the shunt resistor 4, and the bridge circuit 5.

The motor current IM is detected via the shunt resistor 4 and via the motor current detection means 8 and fed back to the subtractor means 14 in the microcomputer 12 so that the motor current IM agrees with the instructed motor current Im.

As a result, the motor 1 is driven by the motor current IM and produces a desired amount of assisting torque in a desired direction. The motor current IM contains a ripple component due to switching operation of the PWM drive of the bridge circuit 5. However, the current is smoothed by the large-capacity capacitor 3.

Generally, in this kind of electric power steering system, detection is made to see whether a contact of the relay has melted and welded before closure of the relay when the steering system is started. A known method of detecting whether the relay contact has melted and welded uses a voltage Vrc at the relay contact to which a load is connected. If the contact of the relay 6 has melted and welded, the relay contact voltage Vrc becomes equal to the battery voltage via the relay 6. Therefore, the presence or absence of the melting of the relay can be detected from the magnitude of the relay contact voltage Vrc. However, when the relay is open, the relay contact voltage Vrc becomes equal to the charging voltage for the smoothing capacitor 3. Consequently, where the electric power steering controller is restarted immediately after turned off, for example, the detection is performed when the smoothing capacitor 3 is not yet fully discharged. That is, the detection whether melting has occurred is done while the relay contact voltage Vrc is high. Hence, fault of the relay 6, i.e., melting and welding, may be misdiagnosed.

To avoid this, in the prior art electric power steering system described above, when melting and welding of the relay contact are detected, the microcomputer must wait until the smoothing capacitor 3 is fully discharged. This prolongs the starting time of the electric power steering system. A readily conceivable method of shortening the discharge time of the smoothing capacitor 3 is to insert a resistor in parallel with the smoothing capacitor 3 before discharging is performed. In this method, however, the electric current consumed when the electric power steering controller is in operation increases. Furthermore, a discharging resistor having a large power loss is necessary.

SUMMARY OF THE INVENTION

The present invention has been made to solve the foregoing problems. It is an object of the present invention to provide an electric power steering controller in which a smoothing capacitor is discharged with low power consumption to thereby shorten the discharge time, thus shortening the starting time.

An electric power steering controller in accordance with the present invention is adapted to give an assisting torque from an electric motor to a steering member for a vehicle, said electric power steering controller comprising:

- a relay containing a first contact at a side of the electric motor and a second contact at a side of a DC power supply and switching a circuit between the electric motor and the DC power supply;
- a smoothing capacitor connected with said first contact;
- a voltage detecting means for detecting a voltage at said first contact; and
- a discharging circuit having a switching means disposed in a discharging circuit for discharging said smoothing capacitor, said switching means being turned on before the relay is driven so as to turn on said first and second contacts.

According to this invention, the smoothing capacitor is discharged in a shorter time. The time taken to detect melting and welding of the relay contact is shortened. Therefore, the starting time of the controller is reduced.

In one feature of the electric power steering controller if said smoothing capacitor is charged to above a given voltage, the smoothing capacitor is discharged to below the given voltage by said switching means.

In this feature, the electric power steering controller can be started in a shorter time by performing discharging only when necessary.

In another feature of the electric power steering controller, said voltage detecting means detects the voltage at said first contact after said smoothing capacitor is discharged by said switching means of the discharging circuit.

In this feature, melting and welding of the contact can be detected with certainty.

In a further feature, the electric power steering controller further comprises a charging circuit for charging said smoothing capacitor, and wherein said charging circuit is so controlled as to charge said smoothing capacitor after said voltage detecting means detects the voltage at said first contact and before said relay is driven to turn on said first and second contacts.

In this feature, the provision of the means for charging the smoothing capacitor can reduce the current through the relay contact. In consequence, melting and welding of the relay contact can be prevented.

In a still other feature of the electric power steering controller, said discharging circuit has a resistor connected between said switching means and said smoothing capacitor, and wherein said resistor is also used as a charging resistor in said charging circuit.

In this feature, because the discharging circuit and the charging circuit can share the resistor in this structure, the number of components in the circuit can be reduced.

In a yet other feature of the electric power steering controller, if said voltage detecting means detects a voltage in excess of a given voltage after said smoothing capacitor is discharged by said switching means, said discharging circuit is so controlled that said smoothing capacitor is discharged again by said switching means after a lapse of a certain wait time.

In this feature, melting and welding of the contact can be detected more reliably.

In an additional feature of the electric power steering controller, said wait time is controlled so as to vary according to the voltage at said first contact.

In this feature, the electric power steering controller can be started more quickly.

Other objects and features of the invention will appear in the course of the description thereof, which follows.

DESCRIPTION OF THE PREFERRED EMBODIMENTS

The preferred embodiments of the present invention are hereinafter described.

Embodiment 1

Figure 1:
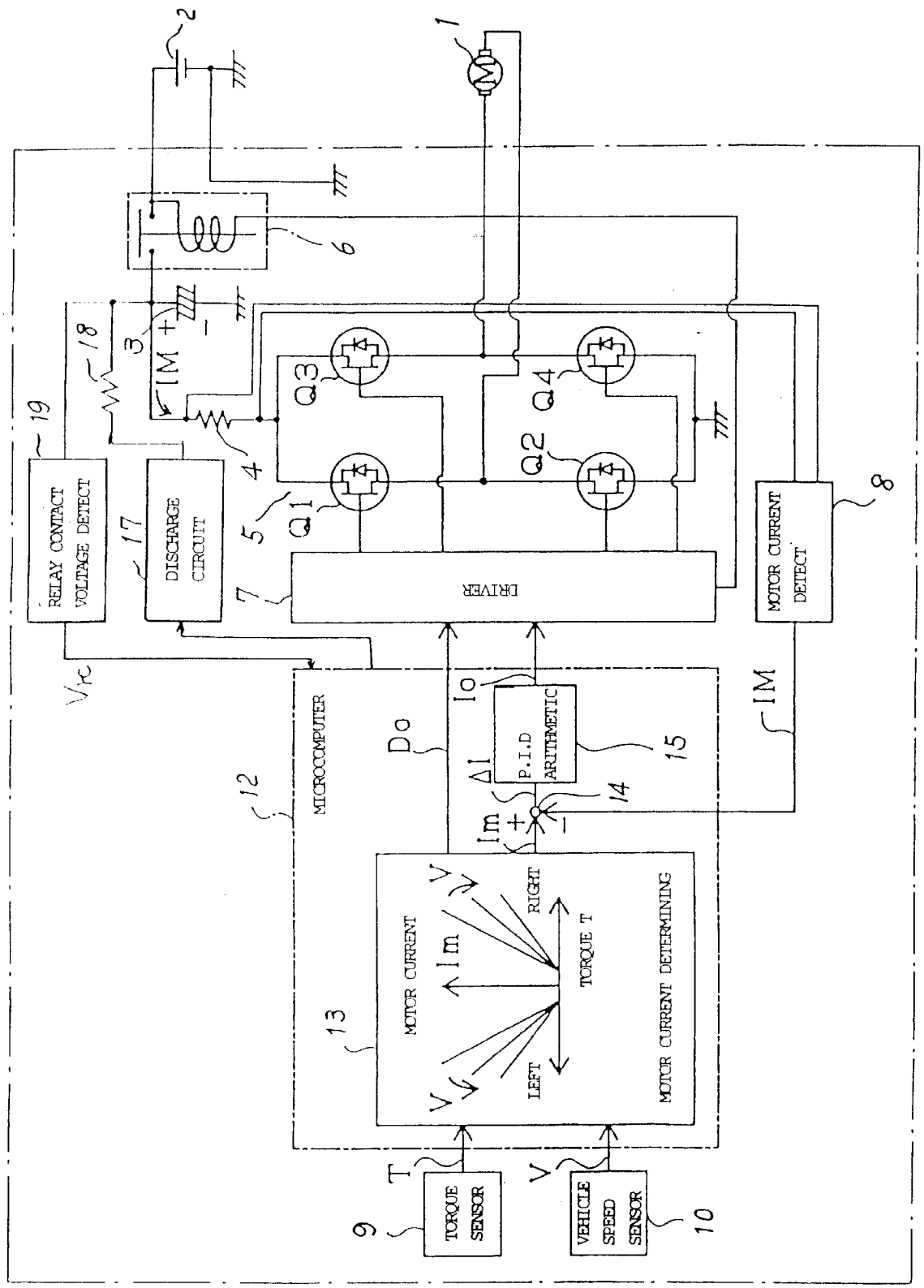
FIG. 1 is a diagram showing the structure of an electric power steering controller in accordance with Embodiment 1 of the present invention.

FIG. 1 shows the structure of an electric power steering controller in accordance with Embodiment 1 of the present invention.

In FIG. 1, an electric motor 1 delivers an assisting torque to the steering wheel (not shown) of a vehicle. A battery 2 supplies motor current IM to the motor 1 to drive it.

A capacitor 3 having a large capacity of about 1000 $\mu$F to 3600 $\mu$F absorbs the ripple component of the motor current IM. A shunt resistor 4 is used to detect the motor current IM. A bridge circuit 5 is made up of plural semiconductor switching elements Q1–Q4 such as FETs for switching the motor current IM according to the magnitude and the direction of the assisting torque. A relay 6 passes or cuts off the motor current IM according to the need, and has a contact 6a on the side of the motor 1, a contact 6b on the side of the battery 2, and an exciting coil 6c for turning on and off these contacts.

A driver circuit 7 controls semiconductor switching elements Q1–Q4 and drives the motor 1 via the bridge circuit 5 and actuates the relay 6. A motor current detection means 8 detects the motor current IM via one end of the shunt resistor 4. The driver circuit 7 and the motor current detection means 8 together form an interface circuit for a microcomputer (described later). A torque sensor 9 detects the steering torque T applied to the steering wheel. A vehicle speed sensor 10 detects the vehicle speed V of the vehicle.

The aforementioned microcomputer (CPU) is indicated by reference numeral 12 and calculates the assisting torque, based on the steering torque T and the vehicle speed V. The microcomputer 12 feeds back the motor current IM and creates a driver signal corresponding to the assisting torque. This microcomputer 12 applies driving signals to the driver circuit 7. One of the driving signals consists of an instruction $D_0$ indicating the direction of rotation for controlling the bridge circuit 5. The other driving signal consists of an amount of controlling current $I_0$.

The microcomputer 12 comprises a motor current-determining means 13, a subtractor means 14, and a PID arithmetic means 15. The motor current-determining means 13 creates the instruction $D_0$ indicating the direction of rotation of the motor 1 and an instruction Im indicating an amount of motor current corresponding to the assisting torque. The subtractor means 14 calculates the current deviation ΔI of the motor current IM from the instructed motor current Im. The PID arithmetic means 15 calculates amounts of correction of proportional (P) term, integral (I) term, and derivative (D) term from the current deviation ΔI and creates an amount of controlling current $I_0$ corresponding to a pulse width modulation (PWM) duty ratio.

The microcomputer 12 further includes an A/D converter, a PWM timer circuit, and other components (none of which are shown) and has a self-diagnosing function. When the system is started, the microcomputer judges whether a contact of the relay 6 is at fault, i.e., whether the contact has melted and welded. Also, the microcomputer makes a fault diagnosis on the system. If no fault is found, the microcomputer actuates the relay 6 and supplies electric power to the bridge circuit 5. During operation of the system, the microcomputer constantly makes a self-diagnosis to judge whether the controller is operating normally. If a trouble or fault occurs, the microcomputer causes the driver circuit 7 to open the relay 6, thus cutting off the motor current IM.

A discharging circuit 17 is a discharge control means that discharges the smoothing capacitor 3, i.e., releases electric charge from the capacitor 3. In particular, the discharging circuit 17 discharges the smoothing capacitor 3 according to a control signal from the microcomputer 12. A resistor 18 determines the time constant of discharging of the smoothing capacitor 3 and protects the discharging circuit 17 from the discharging current. A relay contact voltage-detecting means 19 detects the voltage at the contact 6a on the side of the motor 1 of the relay 6, i.e., detects the voltage at the contact on the side of the smoothing capacitor 3.

Figure 2:
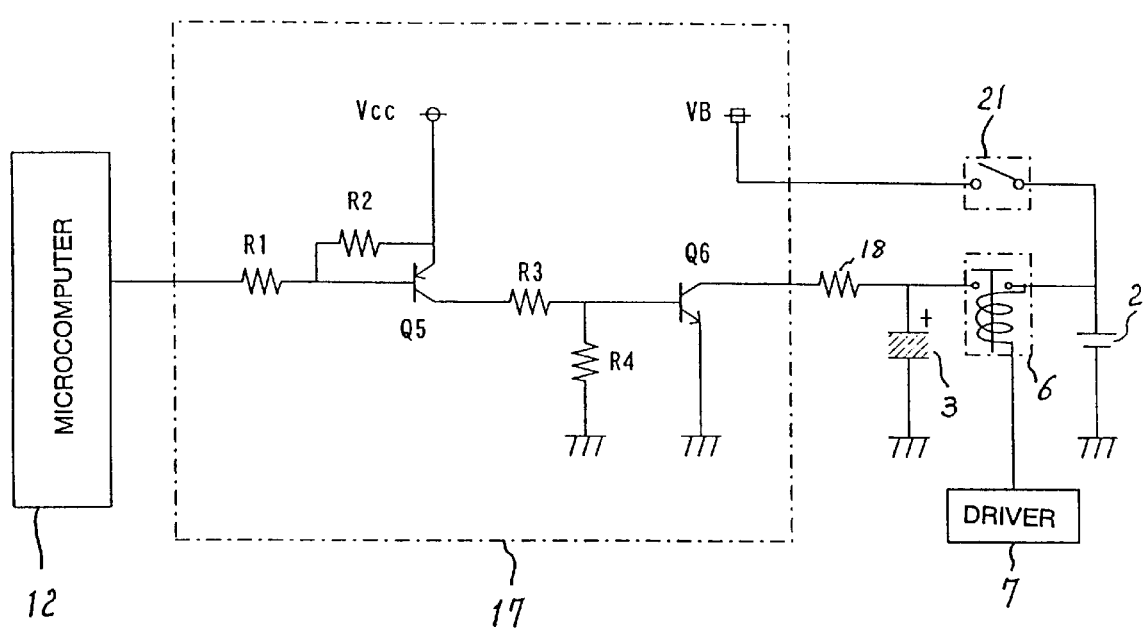
FIG. 2 is a diagram of a discharging circuit included in the electric power steering controller in accordance with Embodiment 1 of the invention.

FIG. 2 is a diagram showing the discharging circuit of the electric power steering controller in accordance with Embodiment 1 of the invention.

In FIG. 2, components 2, 3, 6, 7, 12, 17, and 18 are the same as their respective counterparts of FIG. 1. An ignition switch 21 starts and stops the present electric power steering system. When the ignition switch 21 is turned ON, a voltage VB is applied to the electric power steering system from the battery 2 via the ignition switch 21.

A control signal from the microcomputer 12 (FIG. 1) is applied to the base of the PNP transistor Q5 via a protective resistor R1. A bias voltage is applied by a resistor R2 connected between the emitter and the base of the transistor Q5 and by a constant voltage source Vcc. The collector from the emitter-grounded NPN transistor Q6 is connected to the higher-potential side of the smoothing capacitor 3 via a resistor 18. The collector output voltage from the transistor Q5 is divided by resistors R3 and R4 and applied across the base and emitter of the transistor Q6.

When the ignition switch 21 is turned on, a constant voltage is supplied from the constant voltage source Vcc. If the control signal from the microcomputer 12 is at high level, or if no control signal is delivered, a reverse bias is applied between the emitter and the base of the transistor Q5, turning this transistor off. The transistor Q6 is also turned off. Accordingly, the discharging circuit 17 is disconnected from the smoothing capacitor 3 and does not affect the smoothing capacitor 3 at all.

When the control signal from the microcomputer 12 is at low level, a forward bias is applied between the emitter and the base of the transistor Q5, turning it on. Similarly, a forward bias is applied between the base and emitter of the transistor Q6 via the resistors 3 and R4, thus turning the transistor Q6 on. At this time, the higher-potential side of the smoothing capacitor 3 is grounded via a resistor 18 and the transistor Q6. Therefore, if the capacitor 3 has been charged, it is discharged via the resistor 18 and the transistor Q6.

Figure 3:
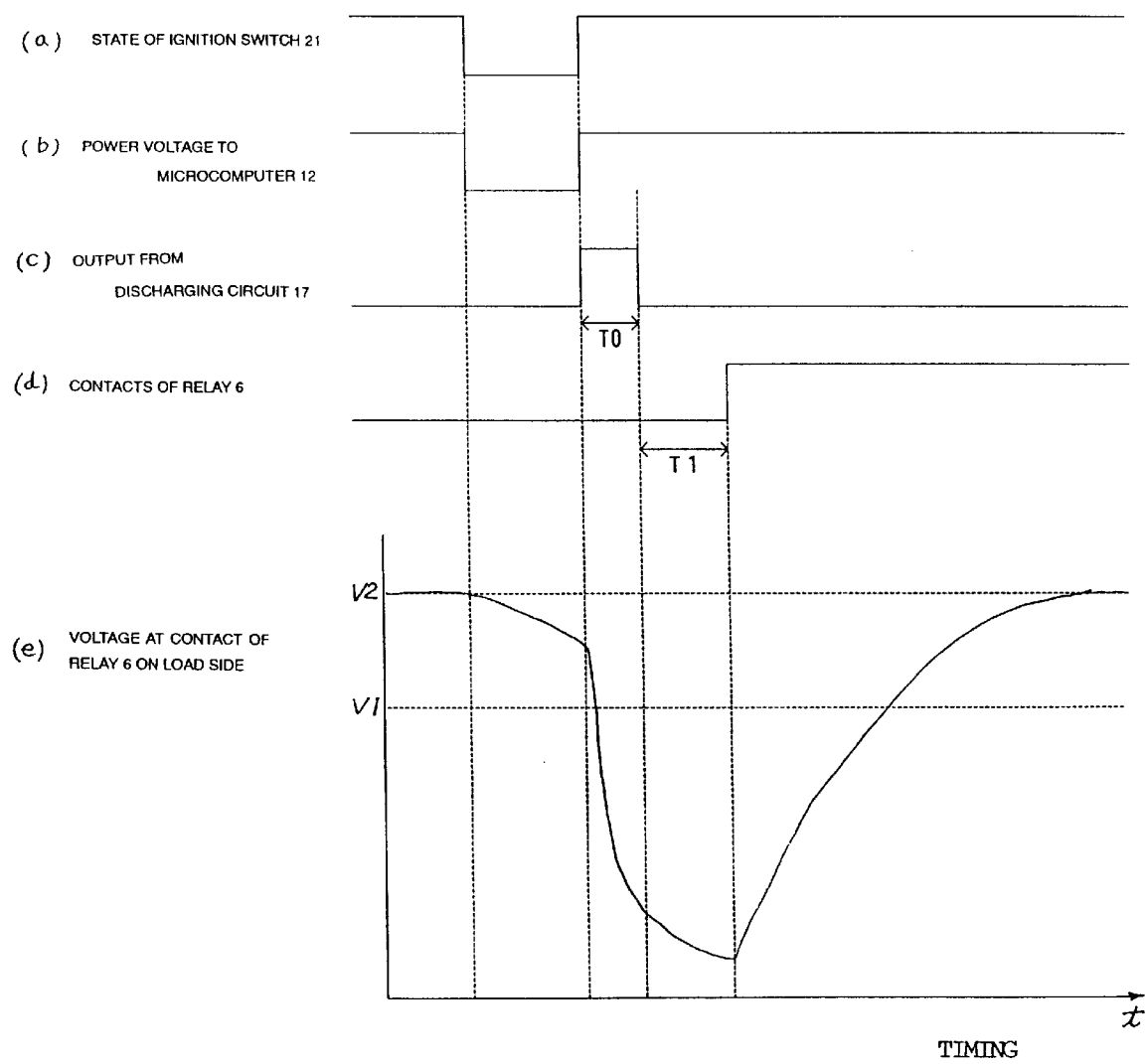
FIG. 3 is a timing chart illustrating the operation of the electric power steering controller in accordance with Embodiment 1 of the invention when the controller is started.

FIG. 3 is a timing chart illustrating the operation of the electric power steering controller in accordance with Embodiment 1 when the system is started. FIG. 3 shows variations of various voltages and signals with the elapse of time t that is plotted on the horizontal axis. (a) indicates variations of a voltage caused when the ignition switch 21 is turned on and off. A high level indicates ON state of the ignition switch 21. A low level indicates OFF state. (b) indicates the state of power-supply voltage applied to the microcomputer 12. A high level indicates the state in which the power-supply voltage is being applied. A low level indicates the state in which the voltage is not applied. (c) indicates the state of the output from the discharging circuit 17, i.e., the state of the transistor Q6. A high level indicates ON state of the transistor Q6, while a low level indicates OFF state. (d) indicates the state of the contacts of the relay 6. A high level indicates OFF state of the contacts 6a and 6b, whereas a low level indicates ON state of the contacts 6a and 6b. The lowest (e) of FIG. 3 shows variations of the voltage at the contact 6a of the relay 6 on the side of the motor 1.

In FIG. 3, T0 indicates the discharge period of the smoothing capacitor 3. T1 indicates the period during which the microcomputer 12 detects melting and welding of the contacts of the relay. V1 indicates a threshold voltage level used to judge whether the relay is at fault, i.e., whether a contact of the relay has melted and welded. During detection of the melting and welding of the relay contacts, if the relay contact voltage Vrc detected by the relay contact voltage-detecting means 19 is greater than this reference value V1, the contact of the relay is judged to be at fault. V2 indicates the saturation voltage level of the smoothing capacitor 3 after the relay 6 is turned on.

The operation of the discharging circuit 17 at the start of this electric power steering controller in accordance with this invention is next described by referring to FIG. 3. When the ignition switch 21 is turned on, the microcomputer 12 is simultaneously turned on. During a period indicated by T0, the microcomputer sends a control signal of low level to the discharging circuit 17. During this period, the transistors Q5 and Q6 in the discharging circuit 17 are turned on. The higher-potential side of the smoothing capacitor 3 is grounded via both resistor 18 and transistor Q6. Therefore, the smoothing capacitor 3 is discharged. The voltage at the relay contacts can be set lower than the threshold voltage level V1 used for judgment of a fault of the relay contacts by appropriately setting the discharge period T0.

Then, the microcomputer 12 sends out a discharging circuit control signal of high level and turns off the transistor Q6 in the discharging circuit 17. At the same time, the relay contact voltage-detecting means 19 detects the relay contact voltage and detects whether a contact of the relay 6 has melted and welded. If no fault is found, the driver circuit 7 actuates the relay 6.

Since the electric power steering controller in accordance with Embodiment 1 is constructed as described thus far, the smoothing capacitor 3 is urged to be discharged simultaneously with turning on of the ignition switch 21. Therefore, the discharge time of the smoothing capacitor 3 is shortened compared with the prior art electric power steering system not equipped with the discharging circuit 17. Hence, the starting time of the electric power steering controller is shortened.

Electric discharging is done via the resistor 18 only when the discharging circuit 17 is turned on. Therefore, electric power consumption is reduced compared with the case in which discharging is done only with a resistor.

Embodiment 2

Figure 4:
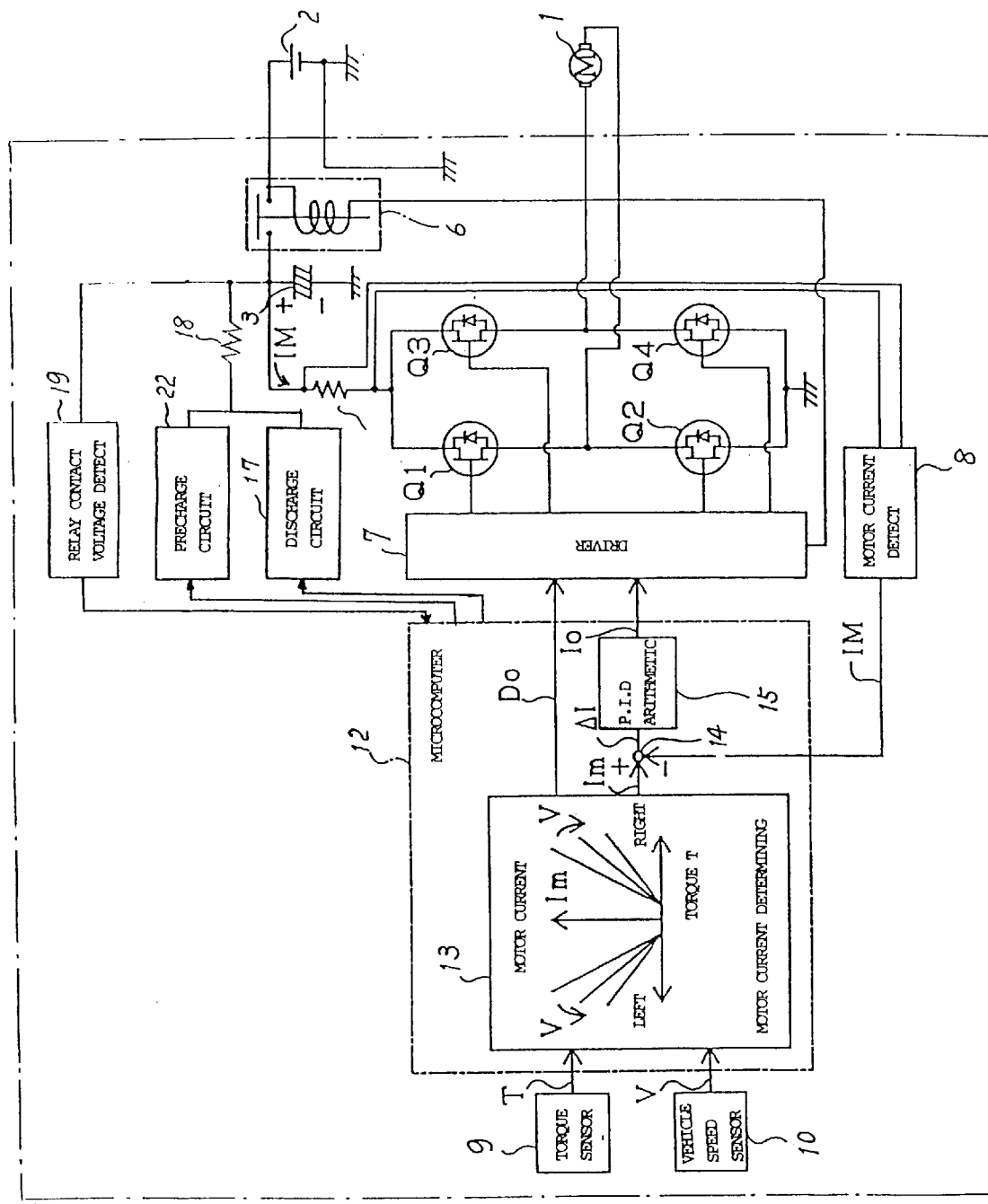
FIG. 4 is a diagram showing the structure of an electric power steering controller in accordance with Embodiment 2 of the invention.

FIG. 4 is a diagram showing an electric power steering controller in accordance with Embodiment 2 of the invention. This Embodiment 2 is similar to Embodiment 1 shown in FIG. 1 except that a precharging circuit is added. In FIG. 4, components 1–19 are the same as their respective counterparts of FIG. 1. The precharging circuit, indicated by numeral 22, is a precharging-and-controlling means that precharges the smoothing capacitor 3. The precharging circuit 22 charges the smoothing capacitor 3 under instructions from the microcomputer 12.

Figure 5:
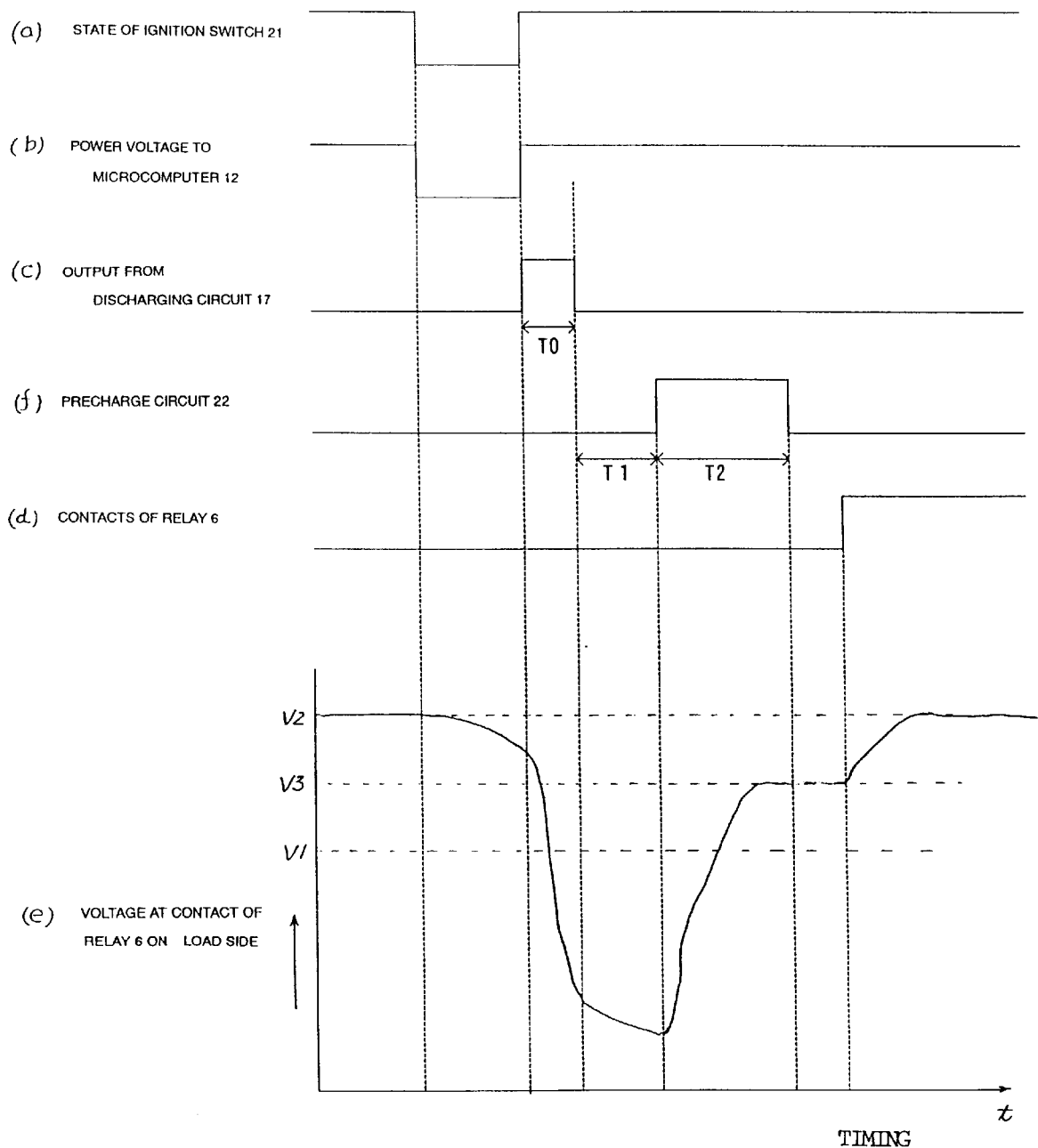
FIG. 5 is a timing chart illustrating the operation of the electric power steering controller in accordance with Embodiment 2 of the invention when the controller is started.

FIG. 5 is a timing chart illustrating the operation of the electric power steering controller in accordance with Embodiment 2 of the invention when the controller is started. The same signals and voltages as shown in FIG. 3 are shown. In addition, the state of the output from the precharging circuit is shown in (f). In FIG. 5, T2 indicates the charging period of the precharging circuit. V3 indicates a voltage level set for precharging.

When the ignition switch 21 of FIG. 2 is turned on, the discharging circuit 17 discharges the smoothing capacitor 3 under instructions from the microcomputer 12. Then, detection whether a contact of the relay has melted and welded is performed during the period T1. If no fault is found, the microcomputer 12 sends a control signal to the precharging circuit 22 to cause it to precharge the smoothing capacitor 3. The precharging circuit 22 charges the capacitor during period T2. The relay contact voltage Vrc is increased to the set precharge voltage level V3. Then, the driver circuit 7 turns on the relay 6.

In the electric power steering controller constructed as described thus far, when the relay 6 is turned on, the smoothing capacitor 3 has been already charged to the set precharge voltage V1. Therefore, inrush current produced when the capacitor is charged up to saturation voltage V3 after the relay 6 is turned on, i.e., the contact current in the relay 6, can be reduced greatly. Hence, melting and welding of the relay contact due to the inrush current can be prevented.

In addition, the discharging circuit 17 and the precharging circuit 22 can share the resistor 18 that determines the time constant of the charging and discharging of the smoothing capacitor 3 and so the number of components in the circuit can be reduced.

In Embodiment 2, the precharging circuit is added to the configuration of Embodiment 1, and the smoothing capacitor is charged. Therefore, the contact current in the relay can be decreased greatly. Melting and welding of the relay contact can be prevented.

Embodiment 3

Figure 6:
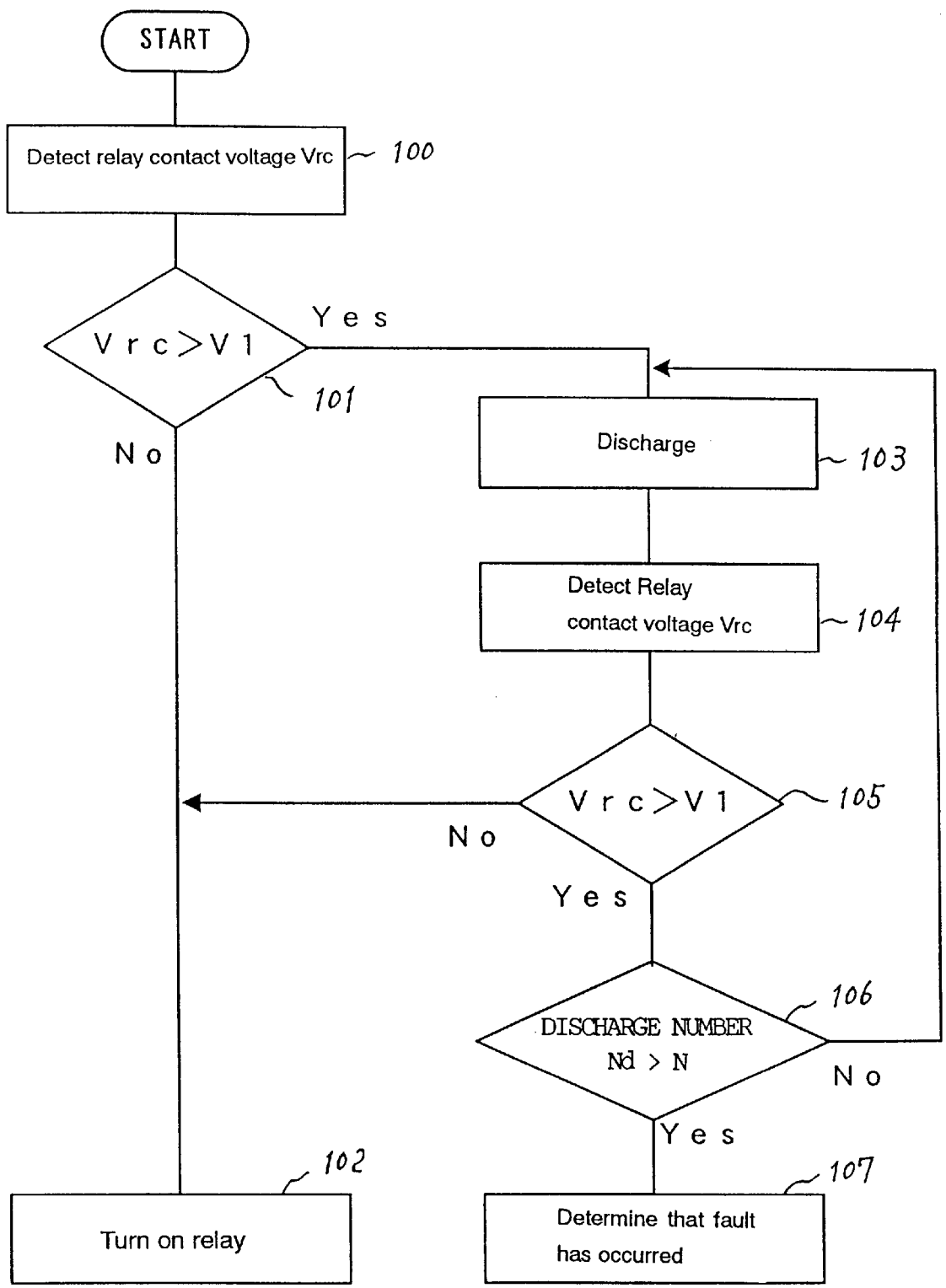
FIG. 6 is a flowchart illustrating processing for starting an electric power steering controller in accordance with Embodiment 3 of the invention.

Embodiment 3 is described by referring to FIGS. 1 and 2. FIG. 6 is a flowchart illustrating the starting processing of an electric power steering controller in accordance with Embodiment 3 of the invention.

In Embodiment 1, melting and welding of the relay contacts are performed after discharging. As illustrated in the flowchart of FIG. 6, detection of melting and welding of the relay contact is carried out first. Then, discharging is performed if necessary.

This flow of control is next described by referring to FIG. 6. When the ignition switch 21 is turned on, the relay contact voltage-detecting means 19 detects the relay contact voltage Vrc (step 100). Then, the relay contact voltage Vrc is compared with the threshold voltage V1 used for detection whether a contact of the relay has melted and welded (step 101). If the relay contact voltage Vrc is less than the threshold voltage V1, the relay 6 is judged to be free of fault. Control then goes to step 102, where the relay 6 is turned on.

On the other hand, if the relay contact voltage Vrc is greater than the threshold voltage V1, control proceeds to step 103, where discharging is performed. In step 104, the relay contact voltage Vrc is again detected. Then, in step 105, the relay contact voltage Vrc is compared with the threshold voltage V1, and melting and welding of the relay contact are detected again. If the relay contact voltage Vrc is less than the threshold voltage V1, the relay 6 is judged to be free of fault. Control then goes to step 102, where the relay 6 is turned on.

If the relay contact voltage Vrc is still greater than the threshold voltage V1, control goes to step 106, where the number of discharges Nd performed up to now is compared with a given number N. If the number of discharges Nd is greater than the given number N, control proceeds to step 107, where the relay is judged to be at fault, i.e., its one contact has melted and welded. If the number of discharges Nd is less than the given number N, control returns to step 103, where discharging is again done. This sequence of operations is repeated until the relay contact voltage Vrc becomes less than the threshold voltage V1 or the number of discharges exceeds the given number N.

In Embodiment 3, by performing the processing described thus far, if the controller is restarted after a lapse of sufficient length of time since the relay 6 is turned off, e.g., the smoothing capacitor 3 spontaneously discharges to thereby lower the relay contact voltage Vrc, the relay is turned on without performing discharging. The starting time is shortened compared with Embodiment 1 in which discharging is done whenever the steering controller is started.

When a restart is done immediately after the relay 6 is turned off, e.g., when the smoothing capacitor 3 has been charged, the capacitor 3 is discharged, and then a decision is made as to whether a contact of the relay has melted and welded. Consequently, misdiagnosis of the relay (i.e., decision as to whether its one contact has melted or welded) due to the charge voltage from the smoothing capacitor 3 can be prevented. Furthermore, the charge stored in the smoothing capacitor 3 is urged to be released from it. Hence, the starting time is shortened compared with the prior art electric power steering system equipped with no discharging circuit.

Where the relay contact voltage Vrc is not lowered sufficiently by the discharge, if a contact of the relay 6 has not melted nor welded, plural discharges are carried out.

This assures that the smoothing capacitor 3 is discharged. If a contact of the relay 6 has melted and welded, detection whether melting and welding have occurred is done plural times. Consequently, melting and welding of a contact of the relay 6 can be detected with certainty.

Embodiment 4

Figure 7:
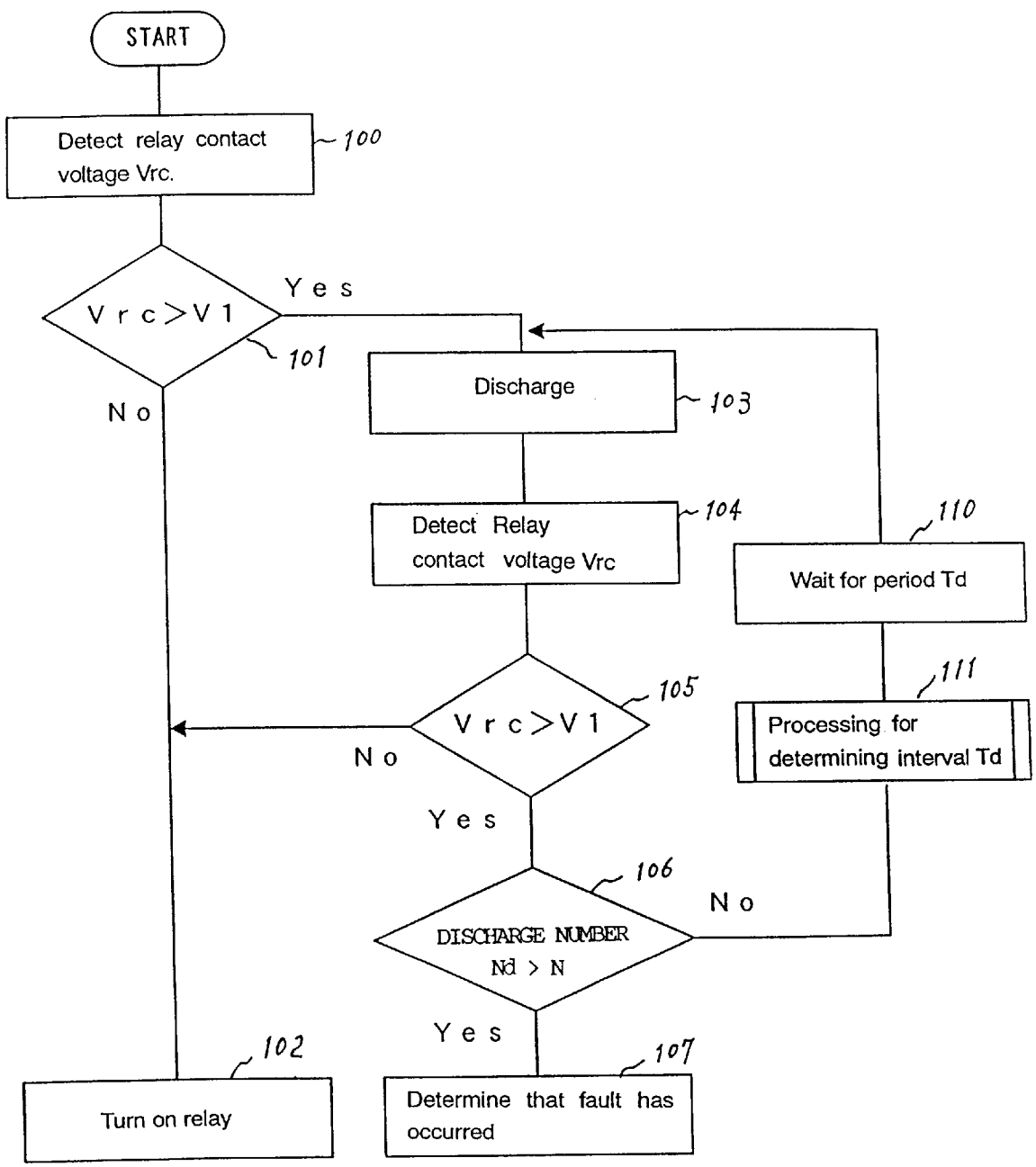
FIG. 7 is a flowchart illustrating processing for starting an electric power steering controller in accordance with Embodiment 4 of the invention.
Figure 8:
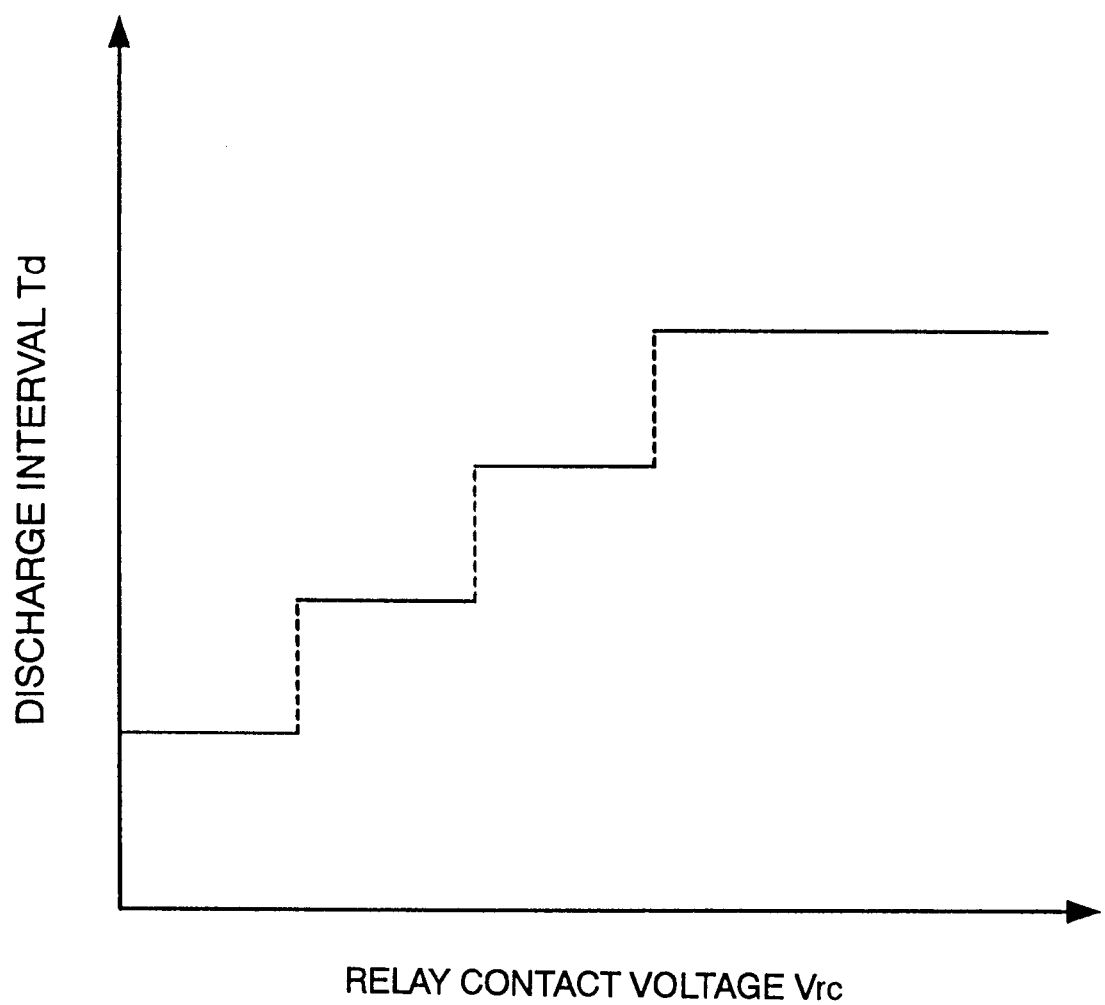
FIG. 8 is a characteristic diagram used to determine the discharge interval Td of the electric power steering controller in accordance with Embodiment 4 of the invention.
Figure 9:
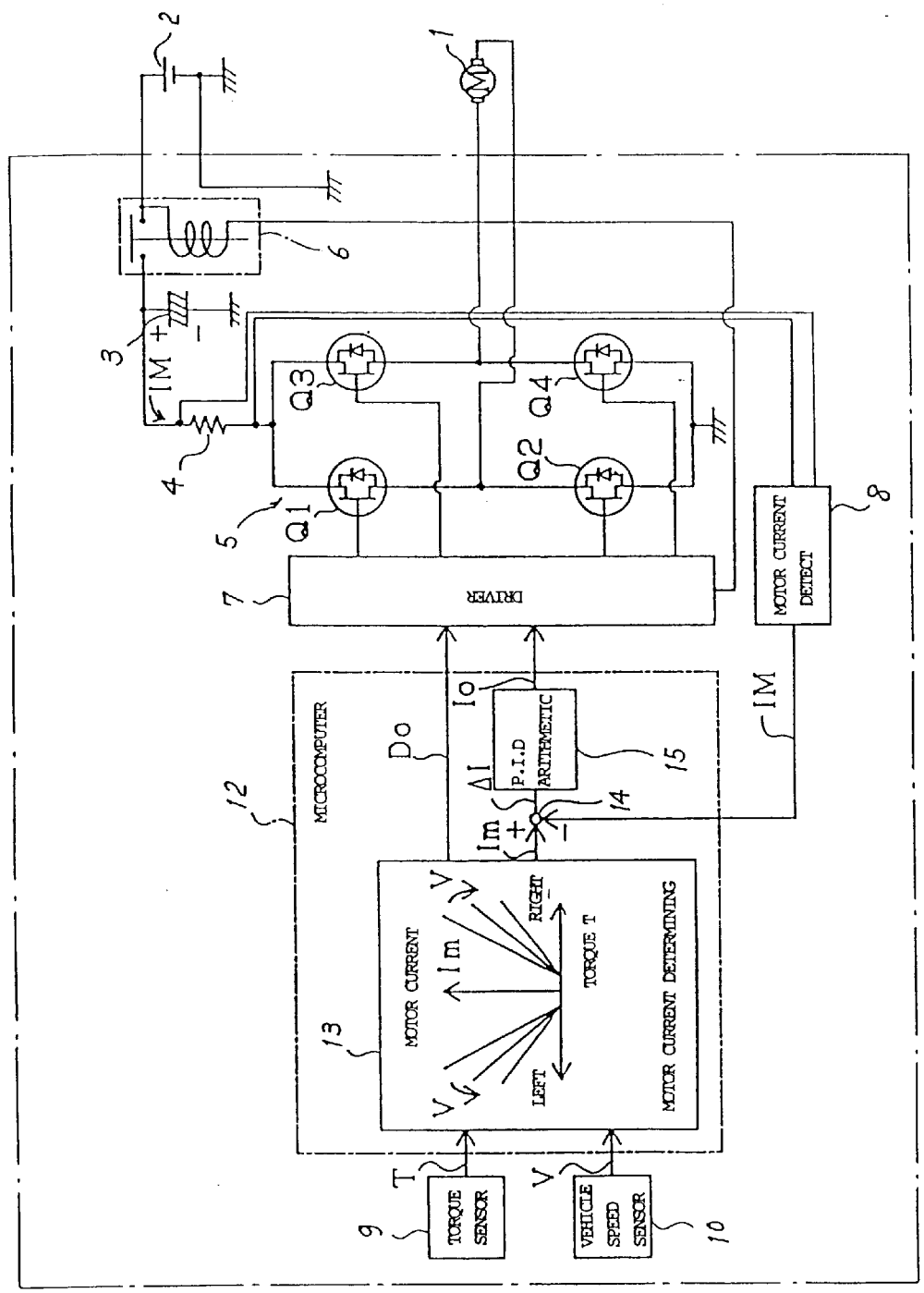
FIG. 9 is a diagram showing the structure of the prior art electric power steering controller.

FIG. 7 is a flowchart illustrating starting processing of an electric power steering controller in accordance with Embodiment 4 of the present invention. FIG. 8 is a characteristic diagram used to determine the discharge interval Td of the electric power steering controller in accordance with Embodiment 4. In Embodiment 3, discharges are performed at regular intervals. The discharge interval may be varied according to the relay contact voltage.

The flow of control of Embodiment 4 is described next by referring to FIG. 7. The processing is the same as the processing illustrated in FIG. 6 up to step 106. If the result of a decision made in step 106 is that the number of discharges Td is less than a given number N, control goes to step 111, where processing for determining the discharge interval Td is performed. In step 111, the discharge interval Td is determined from the relay contact voltage Vrc detected in step 104 by the use of the characteristic diagram of FIG. 8, which illustrates the relation between the relay contact voltage Vrc and the established discharge interval Td. If the relay contact voltage Vrc is high, the discharge interval Td is set to a larger value. If the relay contact voltage Vrc is low, the discharge interval Td is set to a smaller value. Then, the microcomputer waits for a period corresponding to the discharge interval Td determined in step 111 in step 110. Subsequently, control proceeds to step 103, where discharging is done.

Since Embodiment 4 is constructed as described thus far, if the relay contact voltage Vrc is low, i.e., the smoothing capacitor 3 is slightly charged and difficult to be discharged, discharging is performed at short intervals. Therefore, the relay contact voltage Vrc can be reduced below a given value more quickly than Embodiment 3 in which discharging is performed at regular intervals. In consequence, the starting time can be shortened.

What is claimed is:

1. An electric power steering controller adapted to give an assisting torque from an electric motor to a steering member for a vehicle, said electric power steering controller comprising:
   a relay containing a first contact at a side of the electric motor and a second contact at a side of a DC power supply and switching a circuit between the electric motor and the DC power supply;
   a smoothing capacitor connected with said first contact;
   a voltage detecting means for detecting a voltage at said first contact; and
   a discharging circuit having a switching means disposed in a discharging circuit for discharging said smoothing capacitor, said switching means being turned on before the relay is driven so as to turn on said first and second contacts.

2. The electric power steering controller of claim 1, wherein if said smoothing capacitor is charged to above a given voltage, the smoothing capacitor is discharged to below the given voltage by said switching means.

3. The electric power steering controller of claim 1, wherein said voltage detecting means detects the voltage at said first contact after said smoothing capacitor is discharged by said switching means of the discharging circuit.

4. The electric power steering controller of claim 3, further comprising a charging circuit for charging said smoothing capacitor, and wherein said charging circuit is so controlled as to charge said smoothing capacitor after said voltage detecting means detects the voltage at said first contact and before said relay is driven to turn on said first and second contacts.

5. The electric power steering controller of claim 4, wherein said discharging circuit has a resistor connected between said switching means and said smoothing capacitor, and wherein said resistor is also used as a charging resistor in said charging circuit.

6. The electric power steering controller of claim 1, wherein if said voltage detecting means detects a voltage in excess of a given voltage after said smoothing capacitor is discharged by said switching means, said discharging circuit is so controlled that said smoothing capacitor is discharged again by said switching means after a lapse of a certain wait time.

7. The electric power steering controller of claim 6, wherein said wait time is controlled so as to vary according to the voltage at said first contact.

8. An electric power steering controller adapted to give an assisting torque from an electric motor to a steering member for a vehicle, said electric power steering controller comprising:
   a relay containing a first contact at a side of the electric motor and a second contact at a side of a DC power supply and switching a circuit between the electric motor and the DC power supply;
   a smoothing capacitor connected with said first contact;
   a voltage detecting circuit which detects a voltage at said first contact; and
   a discharging circuit having a switching circuit which discharges said smoothing capacitor, said switching circuit being turned on before the relay is driven so as to turn on said first and second contacts.

9. The electric power steering controller of claim 8, wherein if said smoothing capacitor is charged to above a given voltage, the smoothing capacitor is discharged to below the given voltage by said switching circuit.

10. The electric power steering controller of claim 8, wherein said voltage detecting circuit detects the voltage at said first contact after said smoothing capacitor is discharged by said switching circuit of the discharging circuit.

11. The electric power steering controller of claim 10, further comprising a charging circuit for charging said smoothing capacitor, and wherein said charging circuit is so controlled as to charge said smoothing capacitor after said voltage detecting circuit detects the voltage at said first contact and before said relay is driven to turn on said first and second contacts.

12. The electric power steering controller of claim 11, wherein said discharging circuit has a resistor connected between said switching circuit and said smoothing capacitor, and wherein said resistor is also used as a charging resistor in said charging circuit.

13. The electric power steering controller of claim 8, wherein if said voltage detecting circuit detects a voltage in excess of a given voltage after said smoothing capacitor is discharged by said switching circuit, said discharging circuit is so controlled that said smoothing capacitor is discharged again by said switching circuit after a lapse of a certain wait time.

14. The electric power steering controller of claim 13, wherein said wait time is controlled so as to vary according to the voltage at said first contact.

* * * * *